United States Patent [19]

White

[11] Patent Number: 5,531,468

[45] Date of Patent: Jul. 2, 1996

[54] TRAILER ARTICULATION DEVICE

[75] Inventor: Donald White, Russellville, Ark.

[73] Assignee: Sail D. White Enterprises, Inc., Russellville, Ark.

[21] Appl. No.: 368,490

[22] Filed: Jan. 4, 1995

[51] Int. Cl.$^6$ ...................................................... B60D 1/30
[52] U.S. Cl. .......................... 280/463; 280/408; 280/419; 280/474; 280/476.1
[58] Field of Search ................................. 280/476.1, 408, 280/419, 455.1, 456.1, 462, 463, 464, 465, 466, 474

[56] References Cited

U.S. PATENT DOCUMENTS

| | | | |
|---|---|---|---|
| 2,222,827 | 11/1940 | Zuger | 280/464 |
| 4,597,585 | 7/1986 | Littlejohn | 280/474 X |
| 4,770,436 | 9/1988 | Anderson | 280/463 |

FOREIGN PATENT DOCUMENTS

| | | | |
|---|---|---|---|
| 1424211 | 2/1965 | France | 280/462 |

Primary Examiner—Kevin T. Hurley
Attorney, Agent, or Firm—Stephen D. Carver; Trent C. Keisling

[57] ABSTRACT

An articulated trailer utilizing two pivot points and an angular transfer system to control the radial movement of the front axle during turning is disclosed. The articulated trailer comprises an elongated carriage having two spaced-part, wheeled axles. The rear axle rigidly attaches to the carriage while the front axle is pivotally mounted. The carriage front end comprises two spaced-apart pivot points, a hollow jack column assembly and a tongue assembly. A structural assembly supports the jack column assembly and the tongue assembly. A draw bar extends from the tongue assembly to the draft vehicle. Tie-rods attach the ends of the upper tongue assembly to a pair of plates. The plates are interconnected by a shaft. A responder plate is coupled to an electric motor. The electric motor selectively rotates to effect the radial movement of the tongue assembly to transfer angular movement to the jack column assembly. Therefore, the electric motor controls the radial movement of the front axle independently of the draft vehicle movement. Thus the direction of travel of the trailer can be selectively controlled. Limit devices control the angular movement of the jack column assembly and the tongue. When backing the trailer, a locking system may be deployed to prevent pivotal movement of the jack column assembly and the tongue assembly while permitting the unimpeded radial movement of the draw bar.

21 Claims, 12 Drawing Sheets

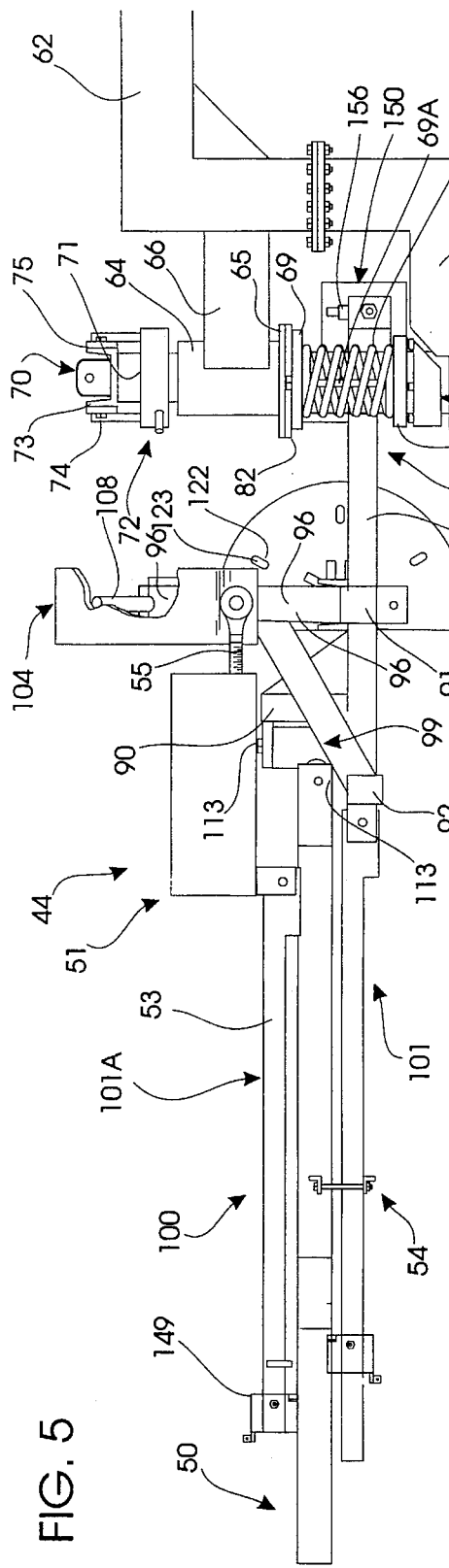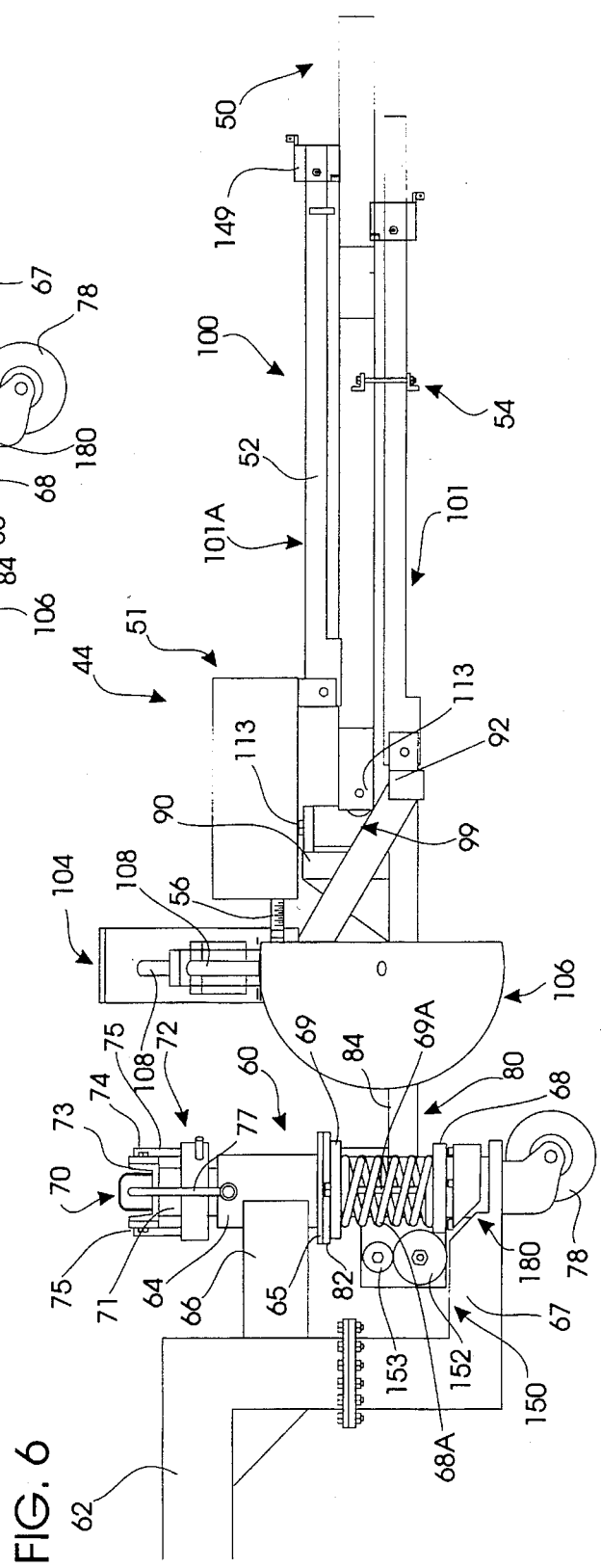

TRAILER ARTICULATION DEVICE

BACKGROUND OF THE INVENTION

I. Field of the Invention

This invention relates generally to articulated trailers towed by a tractor or draft vehicle. In particular, the present invention relates to articulated trailers that use multiple pivoting sections to facilitate cornering. Known prior art relevant to the invention disclosed herein can be found in U.S. Patent Class 280 in the various subclasses found thereunder.

II. Description of the Prior Art

As recognized by those skilled in the trailer arts, effective cornering of lengthy trailers is often a dangerous and difficult task. The prior art is replete with devices that are designed to make cornering lengthy trailers safe. One approach uses a pivoting front axle to turn the front end of the trailer.

The known prior art discloses several arrangements that steer the front wheels of an articulated trailer. The wheels of some of these steerable axles may even be locked in a "straight ahead" position to facilitate backing of the trailers.

However, these devices generally do not turn sharp corners well because the trailer front axle pivots as the draft vehicle turns. This premature pivotal movement often results in the trailer cutting across the corner. This can cause serious damage to the trailer or to objects adjacent the corner (i.e., curbs, stop signs, automobiles, people, etc.).

Another approach to the cornering problem is to split a long trailer into two separate, smaller trailers. Normally, these smaller trailers are connected by assemblies that are commonly known as dollies. Thus, the two small trailers may be towed by one draft vehicle.

U.S. Pat. No. 4,768,802 teaches a steerable dolly having a steering linkage that turns the dolly wheels relative to the dolly frame. A steering linkage facilitates the steering of the dolly depending upon the yaw articulation angle of the configuration. The steering ratio may be manually reduced by reducing the effective length of one of the links on the steering linkage.

Another invention directed toward dolly steering is shown in U.S. Pat. No. 3,995,876. This invention uses the dolly to support and steer the front end of the trailer during backing operations. The dolly is rigidly attached to a small tow vehicle that manipulates the trailer. The assembly increases the maneuverability of the trailer in tight areas. This invention is primarily directed at improving the backing up of the trailer.

U.S. Pat. No. 4,645,226 discloses a dolly that maintains a flexible and rigid sideways connection between the dolly assembly and a lead trailer. This invention is directed at reducing the occurrence of jackknifing during braking or maneuvering.

However, most dolly type devices suffer from problems with controlling the trailers during braking and maneuvering. Thus, dollies do not solve the cornering problem efficiently.

Several known, prior art trailer hitches that utilize multiple connecting points between the draft vehicle and the trailer are of general relevance. These patents include U.S. Pat. Nos. 3,787,068, 3,790,191, 4,405,147, and 3,582,110. All of these devices utilize multiple hitches that have attachment points at or near the leading edge of the trailer.

Several interesting devices are disclosed in U.S. Pat. Nos. 4,111,451, 4,650,205, 4,597,585 and 4,993,738. These devices are of general relevance to the invention disclosed herein but are directed to different structures that solve other problems.

Other patents of lesser relevance include U.S. Pat. Nos. 4,111,450 and 4,768,801. These patents deal with inventions wherein the rear axle of the trailer is designed to pivot. U.S. Pat. No. 4,215,874 discloses a method of pivoting the front and rear frames of the trailer during turning.

I am the named inventor on U.S. Pat. No. 5,295,703. This patent discloses an articulated trailer for sail boats. In that invention, the jack assembly suspends the front axle of the trailer in a locked position out of contact with the ground. A pivoting jack wheel permits the trailer to be steered like a single axle trailer to back the trailer more efficiently.

U.S. Pat. No. 3,556,558 discloses a dual pivoting hitch that attaches a trailer to a draft vehicle. The hitch automatically, mechanically pivots about two points to permit the more effective control of the trailer and to permit sharper turns. This patent does not teach a method of controlling the transfer of angular movement between the two pivot points.

The known prior art fails to adequately address the problem associated with efficiently turning lengthy trailers. The prior art also fails to provide a method of offsetting or swinging a trailer wide in anticipation of sharp turns. Another problem the prior art also fails to address is the need for an easily offset trailer wherein the trailer may be articulated so that it does not directly follow the draft vehicle. An improved trailer would also need to provide an efficient method for orienting the direction of travel of the trailer when backing. An ideal configuration would permit selective, directional trailer movement regardless of the rearward movement of the draft vehicle.

Therefore, a trailer wherein the angular direction of the front axle relative to the draft vehicle is controllable is desirable. Another desirable function of the trailer would be a user selectable guide that ensures the direction of rearward movement of the trailer during backing. My trailer provides the desirable features of a single axle trailer coupled with the desirable features of a articulated trailer.

SUMMARY OF THE INVENTION

The present invention comprises an articulated trailer that utilizes two pivot points and an angular transfer system to control the radial movement of the front axle during turning.

My articulated trailer comprises an elongated carriage that has two spaced-part, wheeled axles. The rear axle is rigidly attached to the carriage. The front axle is pivotally mounted to the front end of the carriage.

The carriage front end comprises two spaced-apart pivot points, a jack column assembly and a tongue assembly. A rigid frame extends rearwardly from the jack column assembly to the rear axle to support the body of the trailer. A draw bar extends from the tongue assembly to the draft vehicle. The draw bar may be selectively pivotally attached at the tongue assembly.

An electric motor assembly controls the transfer of the angular movement of the draw bar tongue to the front axle of the trailer. An electric motor is attached to an intermediate section located between the jack column assembly and the tongue assembly. A pair of tie-rod ends attach the ends of the upper tongue assembly to a pair of plates. The plates are interconnected by a shaft. One of the plates, a responder plate, is directly coupled to the electric motor. The electric motor selectively rotates to effect motion in the responder plate to initiate actuation of axle movement by affecting the angular relationship between the tongue assembly and the front axle assembly. The front axle is mounted to rotate concurrently with the intermediate section. Therefore, the electric motor controls the radial movement of the front axle. Thus the direction of travel of the trailer can be selectively controlled.

A series of control devices permit the angular movement of the jack column assembly and the draw bar to be remotely controlled. The trailer may be operated as a normal trailer or it may be off-set to provide a wider attack angle in sharp turns.

When backing the trailer, a locking system may be deployed to prevent pivotal movement of the jack column assembly. In other words, the jack column assembly stays in a selected angular position while permitting the tongue to freely pivot. This facilitates the backing of the trailer in a chosen direction. Thus, when the draft vehicle moves rearwardly, it does not matter at what angle it moves, the trailer moves in only one predetermined direction.

Thus the primary object of the present invention is to provide an articulated trailer that pivots about a front axle and mounts a pivotal tongue wherein the transfer of angular movement from the tongue to the front axle is remotely controlled.

Another basic object of the present invention is to provide an articulated trailer wherein the front wheels may be locked in a preselected position to permit the efficient backing up of the trailer.

Another object of the present invention is to provide an articulated trailer that swings wide to facilitate cornering.

A related object of the present invention is to provide an articulated trailer that may be remotely off-set from the draft vehicle.

A related object of the present invention is to provide an articulated trailer that may be selectively articulated to improve cornering characteristics.

Another basic object of the present invention is to provide an articulated trailer that provides for the manual off-set of the trailer assembly.

Another basic object of the present invention is to provide a trailer having improved handling characteristics.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a greatly enlarged, fragmentary, side elevational view similar to FIG. 4, showing the front end of the trailer, with portions omitted and pieces broken away for clarity;

FIG. 6 is a greatly enlarged, fragmentary, side elevational view similar to FIG. 5, showing the opposite side of the front end of the trailer, with portions omitted and pieces broken away for clarity;

DETAILED DESCRIPTION

Figure 1:
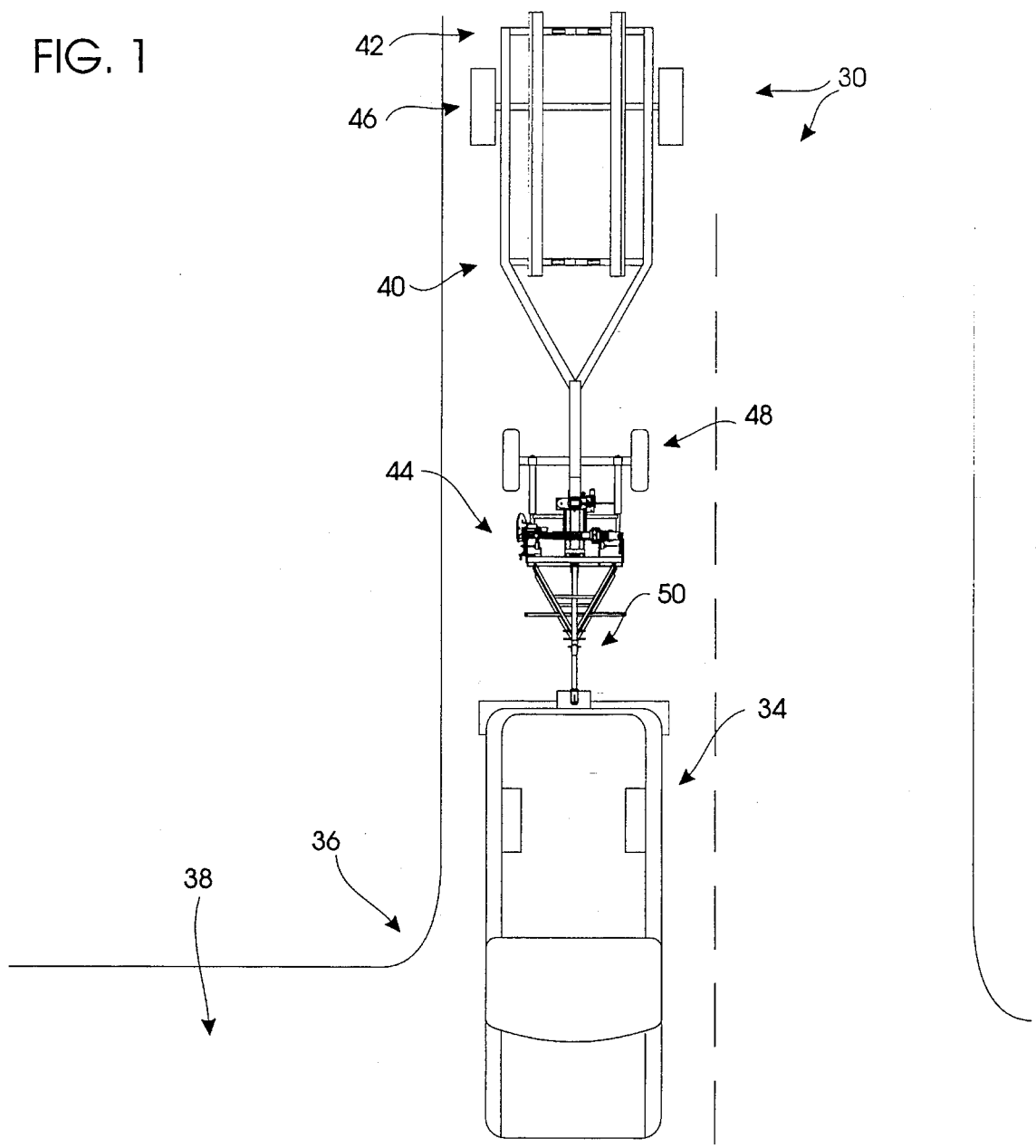
FIG. 1 is an environmental view of the best mode of my Articulated Trailer, showing the trailer approaching a sharp corner.

Referring more specifically to the drawings, my improved articulated trailer is broadly designated by the reference number 30 (FIG. 1). My trailer is normally towed by a conventional draft vehicle 34. The trailer 30 is designed to turn corners 36 on roadways 38.

The trailer 30 comprises an elongated carriage 40 that has two spaced-apart ends 42, 44. A rear axle 46 is rigidly attached near the carriage back end 42. The front axle 48 is pivotally attached to the carriage front end 44. A tongue or draw bar 50 extends from the carriage front 44 to the draft vehicle 34. The draw bar 50 conventionally connects the trailer to the vehicle 34 via a ball and socket connection or by another suitable means.

The front end 44 comprises two vertical axied pivot points and several horizontal axied pivot points. The vertical axied pivot points, a jack column assembly 60 and a tongue assembly 100, are connected by an intermediate section 80 and structural assembly 84. The carriage back end 42 pivots about the jack column assembly 60. A rigid frame 62 extends rearwardly from the jack column assembly 60 to the rear axle 46 to support the body of the trailer 30.

The jack column assembly 60 comprises a vertical casing 64 that houses the upper portion of a vertically oriented jack column 70. The jack column 70 comprises an elongated vertical shaft through the center of the hollow jack column 71 and is topped by a cap ring section 72. A cap 73 is attached between two uppermost tabs 74, 75. The hollow jack column 71 has a spacer lip on its upper end to maintain its position axially against the top of the casing 64. The casing 64 has two tabs that interlock with a cap ring section 72 and tabs 74, 75 to allow the rigid connection of the jack 76 to casing 64. A jack handle 77 extends from the cap section 72. The jack handle 77 rotates to extend or retract a screw extensible pivoting wheel 78 depending from the bottom of the hollow jack column 71.

The casing 64 is attached to an upper, rigid support member 66 that extends from the frame 62. A centrally orificed upper thrust bearing plate 65 defines the bottom of the casing 64. The middle portion of the hollow jack column 71 penetrates plate 65. The hollow jack column 71 journals in the casing 64. A lower horizontal support member 67 attaches to the bottom of the intermediate section 80.

Figure 2:
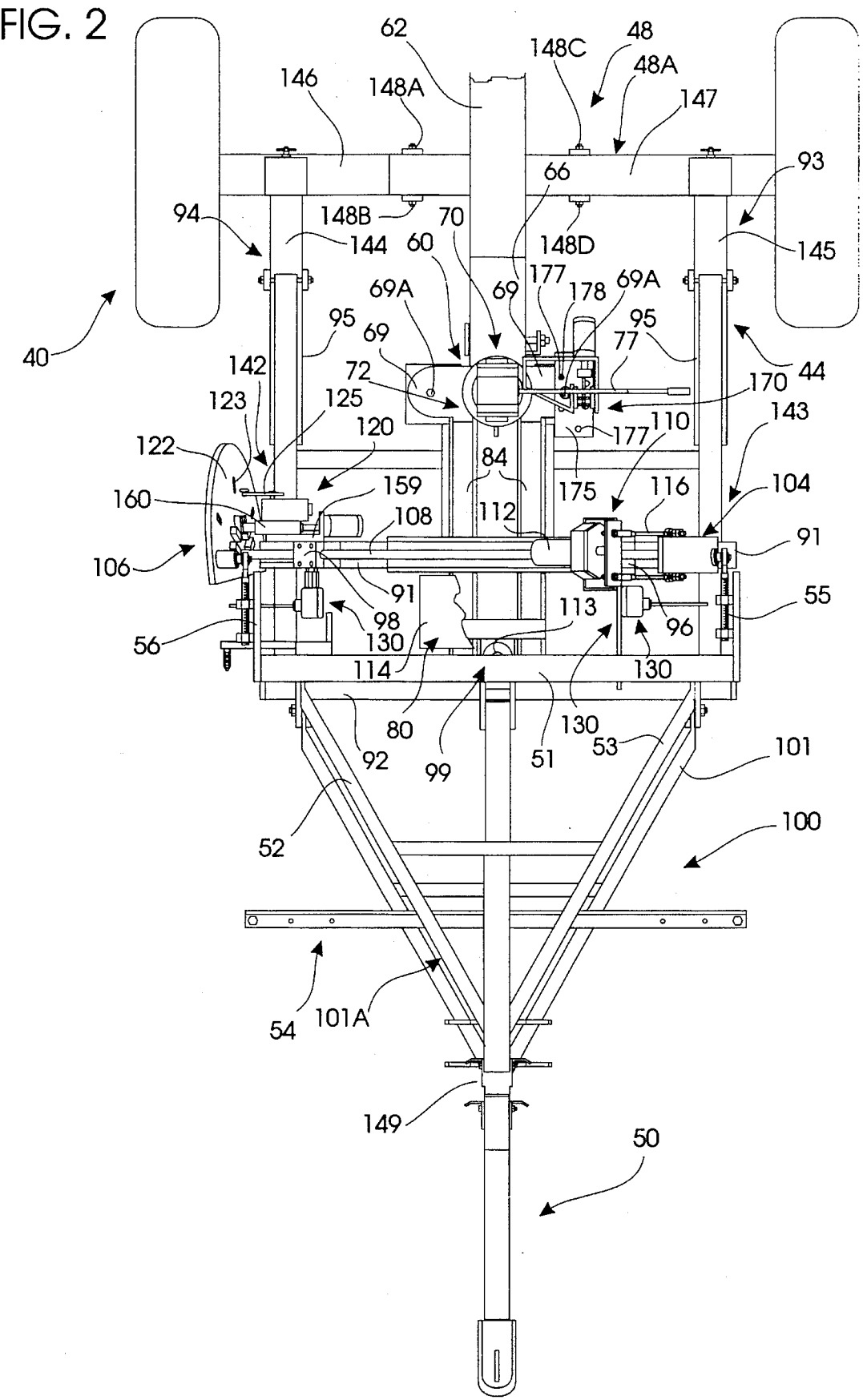
FIG. 2 is an enlarged, fragmentary, top plan view showing the front end of the trailer, with portions omitted and pieces broken away for clarity.

The intermediate section 80 encircles the jack column 70 and the hollow jack column 71 below the casing 64. A lower thrust bearing plate 82 forms the top of the intermediate section 80 that sleeves about the journal bearings of the hollow jack column 71. The lower thrust bearing plate 82 flushly abuts the thrust bearings between 82 and upper thrust bearing plate 65. A structural assembly 84 extends forwardly from the intermediate section 80 to the locating holes for the draw bar vertical shaft 99. The intermediate section 80 has a gusseted coil spring upper support brackets 69 depending from opposite sides of the intermediate section 80 (FIGS. 2, 5 and 6). These brackets are centrally orificed for the placement of coil spring limiter bolts 69A.

The structural assembly 84 supports the central portion of the trailer. The structural assembly 84 is indirectly supported by the front axle 48. Structural assembly 84 is intersected by two lateral cross members 91, 92. Two spaced apart parallel beams form two runners or subassemblies 93, 94. The subassemblies 93, 94 extend rearwardly from the exterior ends of cross members 91, 92. The front axle 48 supports the subassemblies 93, 94.

The front axle 48 comprises a pair of spaced-apart wheels connected by a flexible shaft 48A. Two support subassemblies extend forwardly from the shaft 48A. The subassemblies 93, 94 pin to lateral member 91 to support the bottom of the structural assembly 84.

Subassemblies 93 and 94 comprises an arm 142, 143 and sleeve 144, 145 arrangement. The sleeves 144, 145 extend rearwardly to a threaded hole to receive retaining bolts. The sleeves 144, 145 are affixed to opposite sides of the front axle 48.

The lower support brackets 68 are directly supported by the sub assemblies 93, 94. The coil springs 68A are captivated between the lower and upper brackets 68, 69. The brackets 68, 69 each are centrally penetrated by a limiter bolt 69A. Thus, the structural assembly 84 is suspended to the hollow column jack assembly 71 to permit movement therebetween. The front axle 48 is located behind the jack column assembly, facilitating turning. This spaced-apart relationship is to provide the clearance critical to avoid interference with the lower rigid support vertical member 67 when the axle is steered at the 90 degree angle possible with this preferred embodiment. The subassemblies 93, 94 also allow the flexible shaft 48A to move up and down, operating as an auxiliary suspension system in conjunction with the leaf springs 95.

The flexible axle 48A comprises two halves 146, 147 extending inwardly from the wheels. The halves 146, 147 connect to each other by shackles 148A–D interiorly of the sleeves 144 and 145. This arrangement allows longitudinal movement of the axle length while not allowing bending or sagging in the middle. The shackles 148A-D form the uprights of a parallelogram arrangement with the left and right axle forming the horizontals. As the axle stretches from minimum to maximum length, the parallelogram goes from slant to vertical to slant the other way.

Intermediate section 80 and structural assembly 84 connects the tongue assembly 100 and the front axle 48 to the rest of the trailer. Structural assembly 84 also supports the electric motor system 110.

A motor support bracket 96 attaches to section 80 adjacent the exterior end of cross member 91. The bracket 96 supports components of the electric motor system 110 and a responder plate 104. Another bracket 98 attaches to structural assembly 84 adjacent to the end of cross member 91, opposite bracket 96. Bracket 98 supports components of the electric motor system 110 and a selector plate 106.

A vertical shaft 99 attaches through holes to structural assembly 84 in front of and above the intersection of structural assembly 84 and cross member 92. Brackets 96 and 98 terminate on their upper extreme which journal half for offset shaft and upper journal halves and greasing means and mounting holes and hardware.

The tongue assembly 100 comprises a draw bar 50, a lower auxiliary tongue 101 and an upper limit tongue 101A. The lower auxiliary tongue 101 mounts to structural assembly to tabs formed on the front edge of cross member 92 through holes with bolts, nuts and washers. The draw bar 50 pivotally sleeves about a section of vertical shaft bolt 99 and horizontal shaft bolt 113.

The upper tongue 101A is mounted to a base cross member 51. The cross member 51 extends laterally between plates 104, 106. Tongue members 52, 53 extend forwardly from base member 51 to a latch assembly 149. Latch assembly 149 is fitted to accommodate the tongue between a keeper on either side when pivoted to the latched mode.

A manual limiter 54 slidably houses a portion of the lower tongue assembly 100 to restrict the radial movement of the draw bar 50. An inboard pin hole may accept pins to further restrict radial movement of the draw bar 50 to maintain a better vector when backing trailer up a steep grade. The limiter 54 also keeps the lower auxiliary tongue 101 raised up against draw bar 50 for secure locking. A number of solenoids mounted upon the auxiliary tongue 101 may also selectively secure the draw bar 50 in a non-pivoting deployment.

A tie rod 55 extends from an exterior end of the base member 51 to the responder plate 104. A similar tie rod 56 extends from the opposite exterior end of the base member 51 to the selector plate 106. An offset shaft 108 with its end play limiting tabs extends from the responder plate 104 to the selector plate 106. Thus, when the motor 112 drives the rotation of the offset shaft the tongue 50 pivots.

The electric motor system 110 controls the rotary movement of the responder plate 104 and the selector plate 106. The electric motor system comprises an electric motor 112 mounted on bracket 96 and a control box 114 mounted adjacent to the motor. A pair of links or coupling arms 116 couple the motor 112 to the responder plate 104. A straight position switch 120 is mounted on bracket 98 adjacent the selector plate 106. Tab 122 in the plate 106 defines straight position electrical logic. A remote switch activates the motor 112. The motor 112 rotates the responder plate 104, which axially rotates the selector plate 106. A number of position limit cut-off switches 130 prevent over rotation of the selector plate 104 or the responder plate 106.

A contemplated alternative embodiment could utilize this principle but use a geared driver. One example is a small sprocket inboard of the responder plate 104 using the same key with the key modified to clear either the small sprocket or the responder plate to slow down the rotational rate of the offset shaft without sacrificing torque. This could be manipulated by lever action.

A manual rotation system 150 permits the manual rotation of the jack column assembly to independently steer the trailer 30 (FIGS. 5 and 6). A number of reduction gears 152, 153 may be rotated to advance a gliding lever nut 156. The gliding lever nut also slides longitudinally along a slot formed in support 67. The gliding lever nut 156 advances laterally to pivot the intermediate section 80. This pivotal movement rotates the rear of the trailer relative to the front of the trailer.

Figure 3:
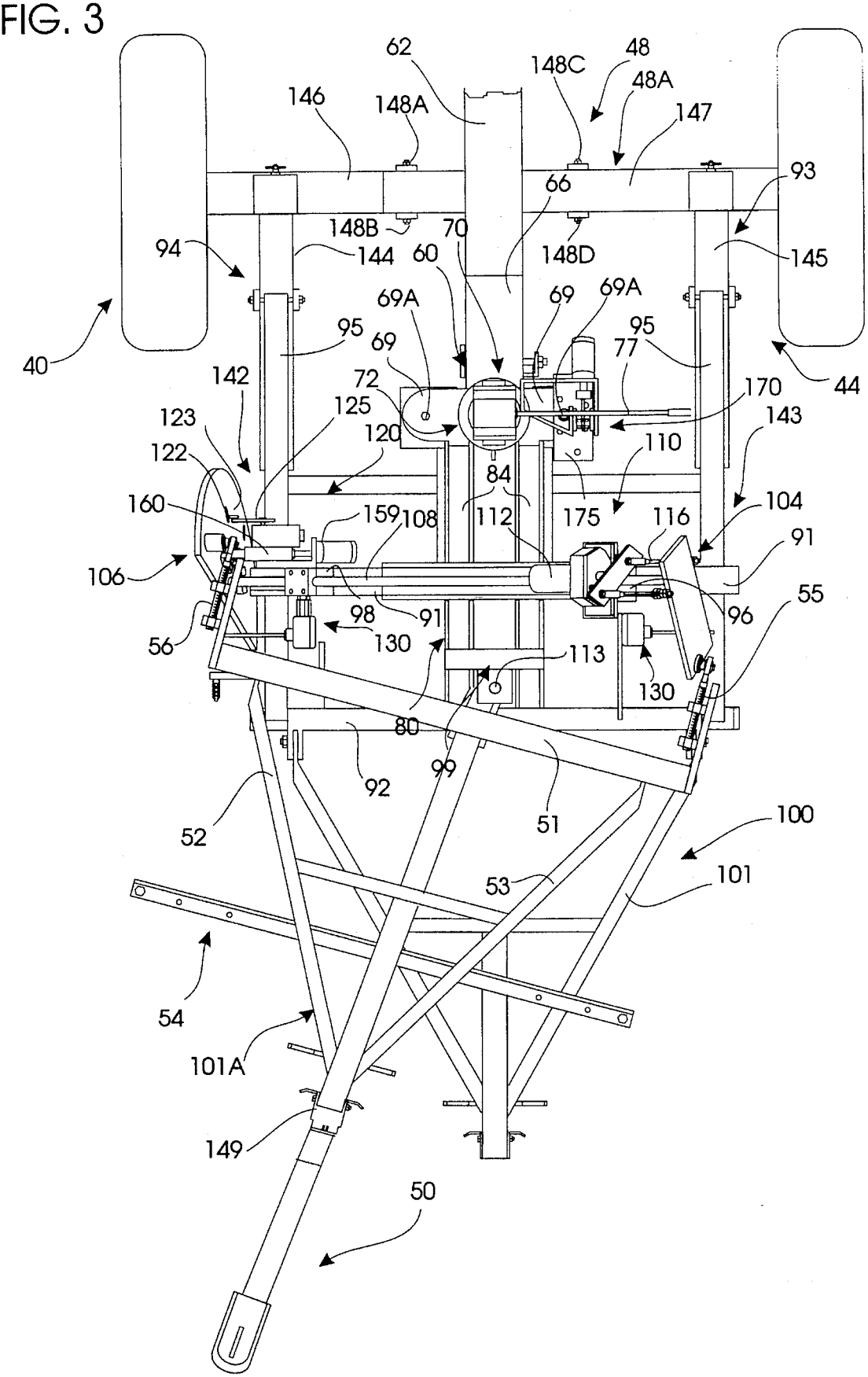
FIG. 3 is an enlarged, fragmentary, top plan view similar to FIG. 2, showing the front end of the trailer, with portions omitted and pieces broken away for clarity.
Figure 4:
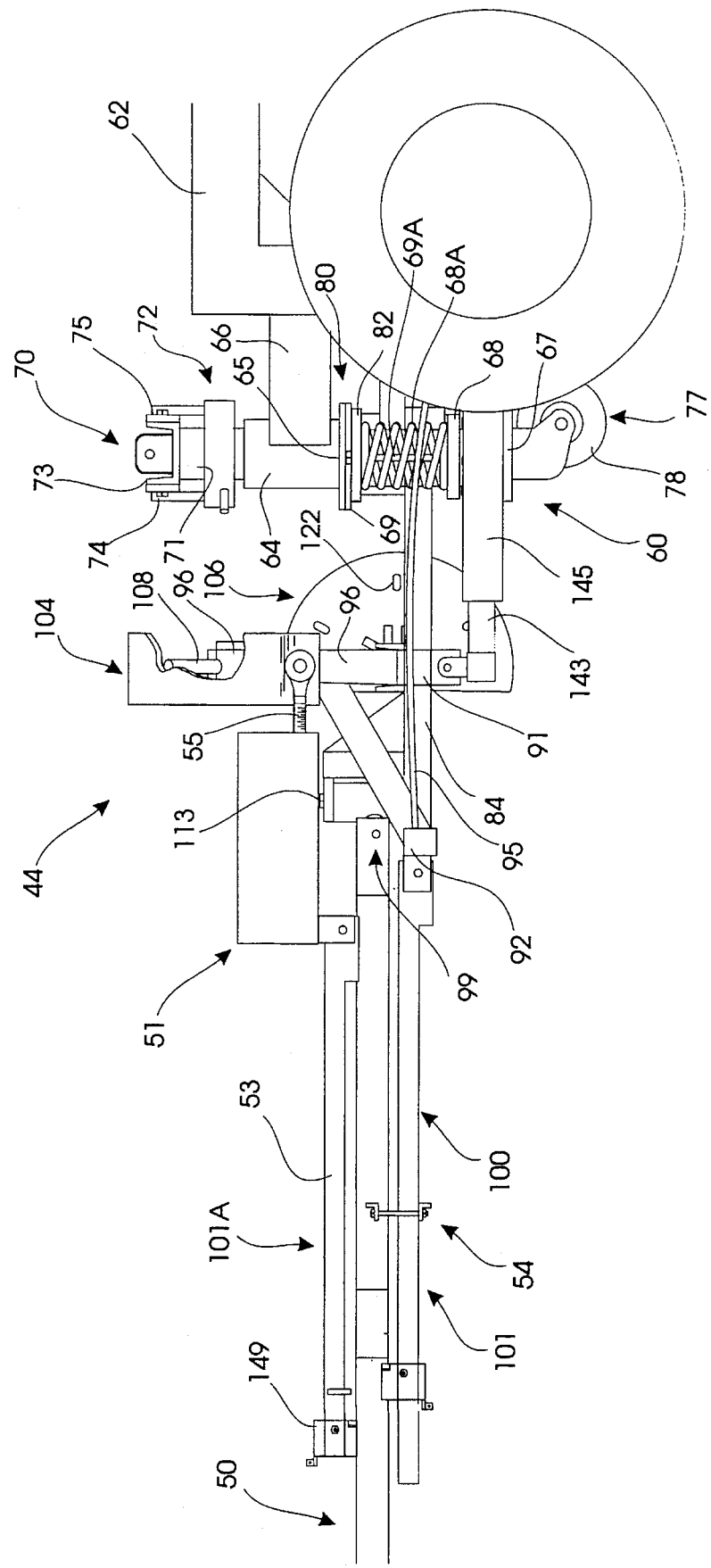
FIG. 4 is an enlarged, fragmentary, side elevational plan view showing the front end of the trailer, with portions omitted and pieces broken away for clarity.

Referring back to FIGS. 2 and 3, a trailer offset shaft assembly includes a bracket 159 extending from bracket 98.

Bracket 159 mounts a deadbolt type latch 160 with a protruding bolt with having a direction of operation parallel to the offset shaft 108. This deadbolt device interlocks on its outer end into one of the bolt receivers slots for the appropriate position when in the locked position. When the selector plate 106 is to rotate, the bolt unlocks by sliding rearwardly to provide clearance.

There is a latch on the lower auxiliary tongue 101 and an auxiliary tongue latching solenoid linked to operate the lower auxiliary tongue latch. Preferably this latch has in proximity to each side a position switch which can be bypassed for backing or actuated to initiate the de-energizing of the lower auxiliary tongue solenoid and latching of the draw bar 50 back to the centered position, when desired and properly positioned. Under normal conditions, draw bar 50 can be brought back to center by selective actuation of the electric motor and offset mechanism.

This lower auxiliary tongue latch has two parallel flats which will fit to either side of the draw bar 50 when latched but will pivot down to clear any side to side movement of the draw bar assembly 50 when unlatched. The latch has wings on opposite sides with a downwardly tapered end section to prevent any unintentional snagging as the draw bar 50 traverses across the latch assembly during backing operation. This latch is attached with a through bolt with the lengthwise channel portion of the assembly.

The intermediate section 80 has a lock system 170 selectively prevents the pivotal movement of the jack column assembly 60. Preferably, the lock system 170 is remotely actuable. The other than straight axle position lock plate 175 is mounted horizontally above the left upper coil spring support bracket 69. The locking plate 175 has orifices 176 drilled at a number of locations, radially spaced at a given radius from the center of pivot articulation of the intermediate section 80. A locking rod 177 penetrates a selected orifice 176 and is remotely inserted into the aperture to prevent articulation and hold the axle position in that particular orientation for backup operation.

On the lower end of the intermediate section 80 is solidly affixed a protruding rectangular female rail or spline which forms the stationary portion of the straight axle position lock assembly 180. The straight axle lock assembly also uses two vertical diametrically opposed keys depending from the lower casing 68. In operation, the spline which is captivated by the keys is caused to slide up and engage the female rail or spline to prevent rotary movement of the intermediate section.

Operation

The forward operation of my trailer can best be seen in FIGS. 7–10. The trailer 30 may be offset in anticipation of sharp corners 36 in road 38. The motor 112 is activated by an operator as the draft vehicle enters the corner 36. The motor 112 rotates, either clockwise or counterclockwise. For purposes of this discussion, only clockwise rotation will be discussed as counter-clockwise rotation produces the opposite turns.

Figure 7:
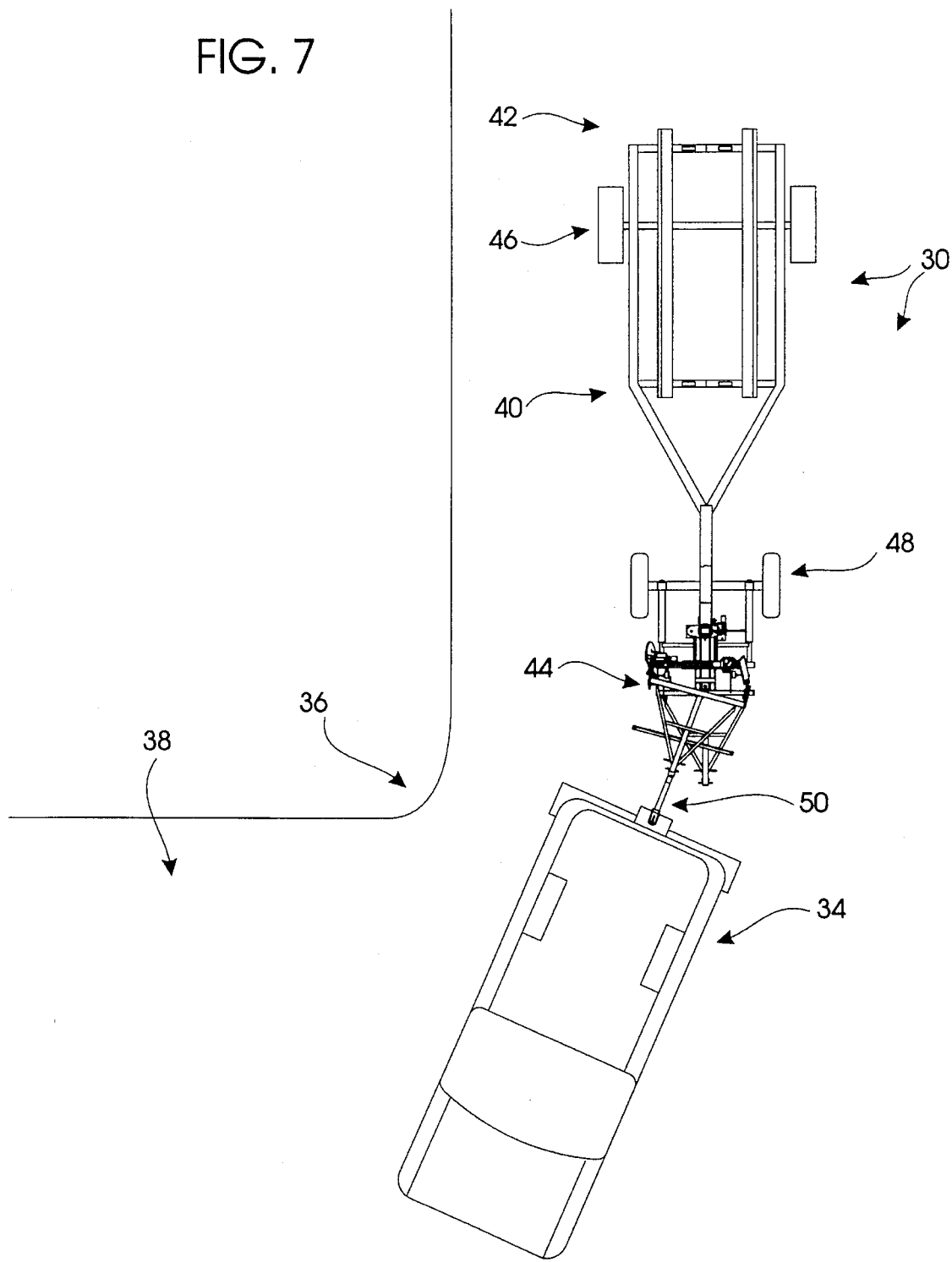
FIG. 7 is an environmental view similar to FIG. 1, showing the trailer approaching a sharp corner.
Figure 8:
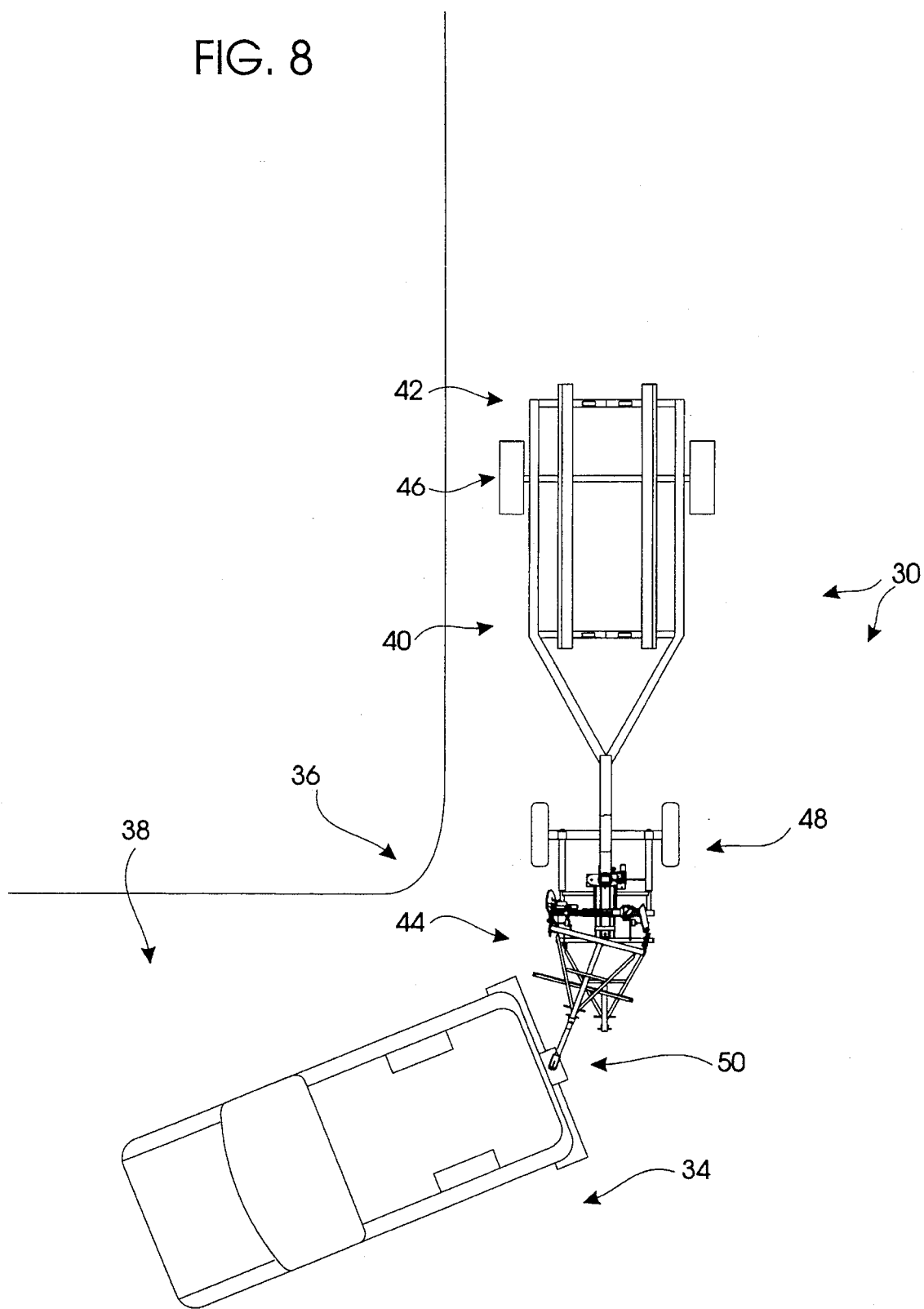
FIG. 8 is an environmental view similar to FIG. 7, showing the trailer during cornering.

As the motor rotates, the top of the responder plate 104 moves toward the trailer rear. This motion cooperates with the direction of travel of the vehicle and permits the trailer to remain headed in a straight forward direction or if actuated earlier steer axle opposite the direction required to negotiate the corner to make front of trailer swing wide while the draft vehicle turns (FIGS. 7–8).

Figure 9:
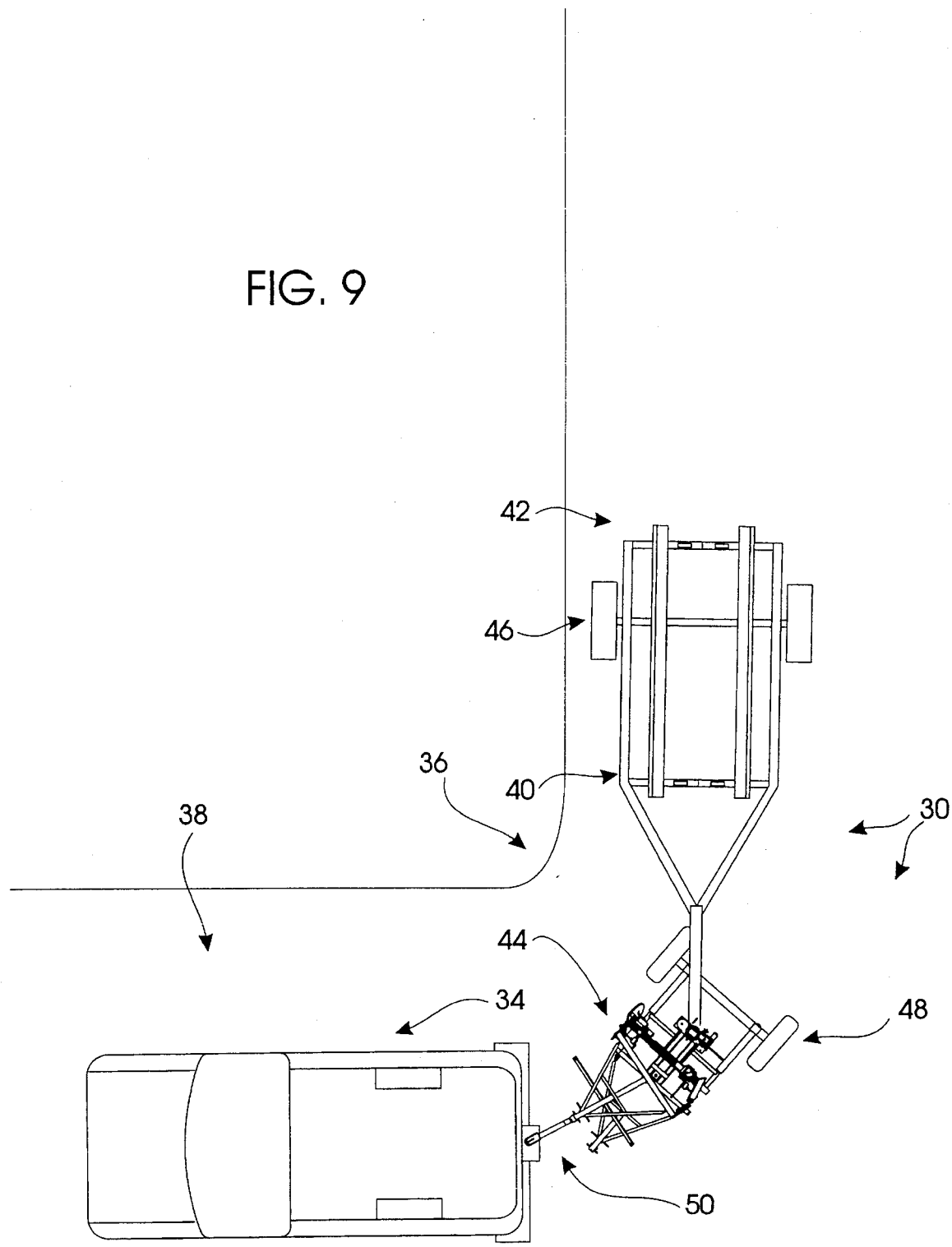
FIG. 9 is an environmental view similar to FIG. 8, showing the trailer during cornering.
Figure 10:
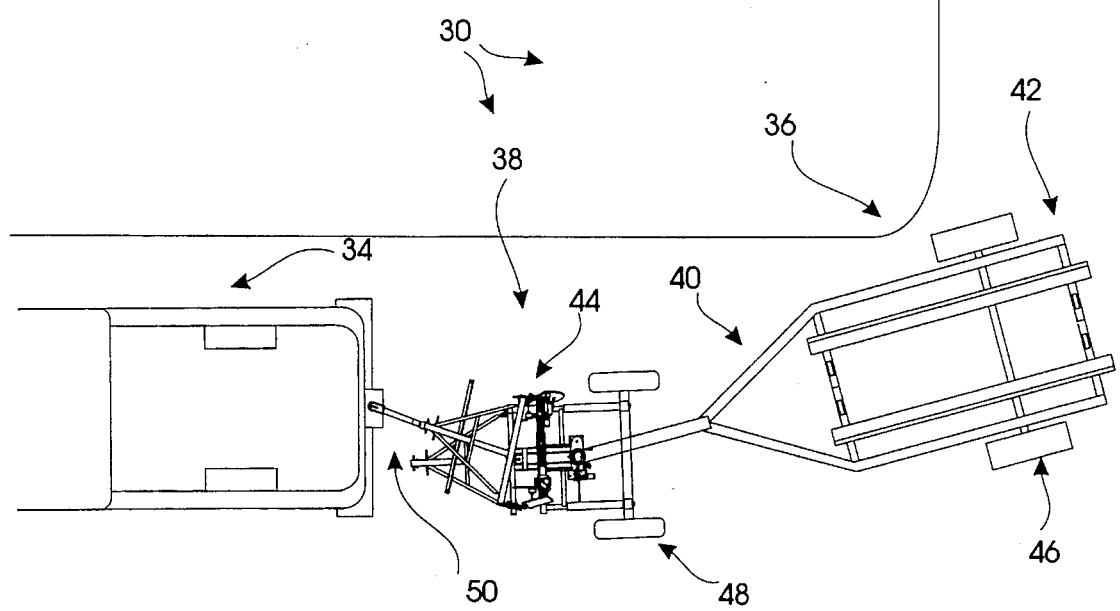
FIG. 10 is an environmental view similar to FIG. 9, showing the trailer immediately after cornering.

After the draft vehicle 34 rounds corner 36, the selector plate notch 123C aligns with selector arm 125. This alignment activates the limit switch 130 which deactivates the motor 112. The lateral vector draft vehicle movement acts upon the direction of travel of the trailer 30 and turns the front axle 48 in the direction of travel of the draft vehicle (FIG. 9). This permits the trailer 30 to begin rounding corner 36.

As the trailer finishes rounding corner 36, the operator activates the motor 112 to return the trailer to straight axial alignment. The motor rotates counter-clockwise until the selector plate notch 123M aligns with selector arm 125. As the trailer moves forward, axial alignment of the trailer is straightened.

Figure 11:
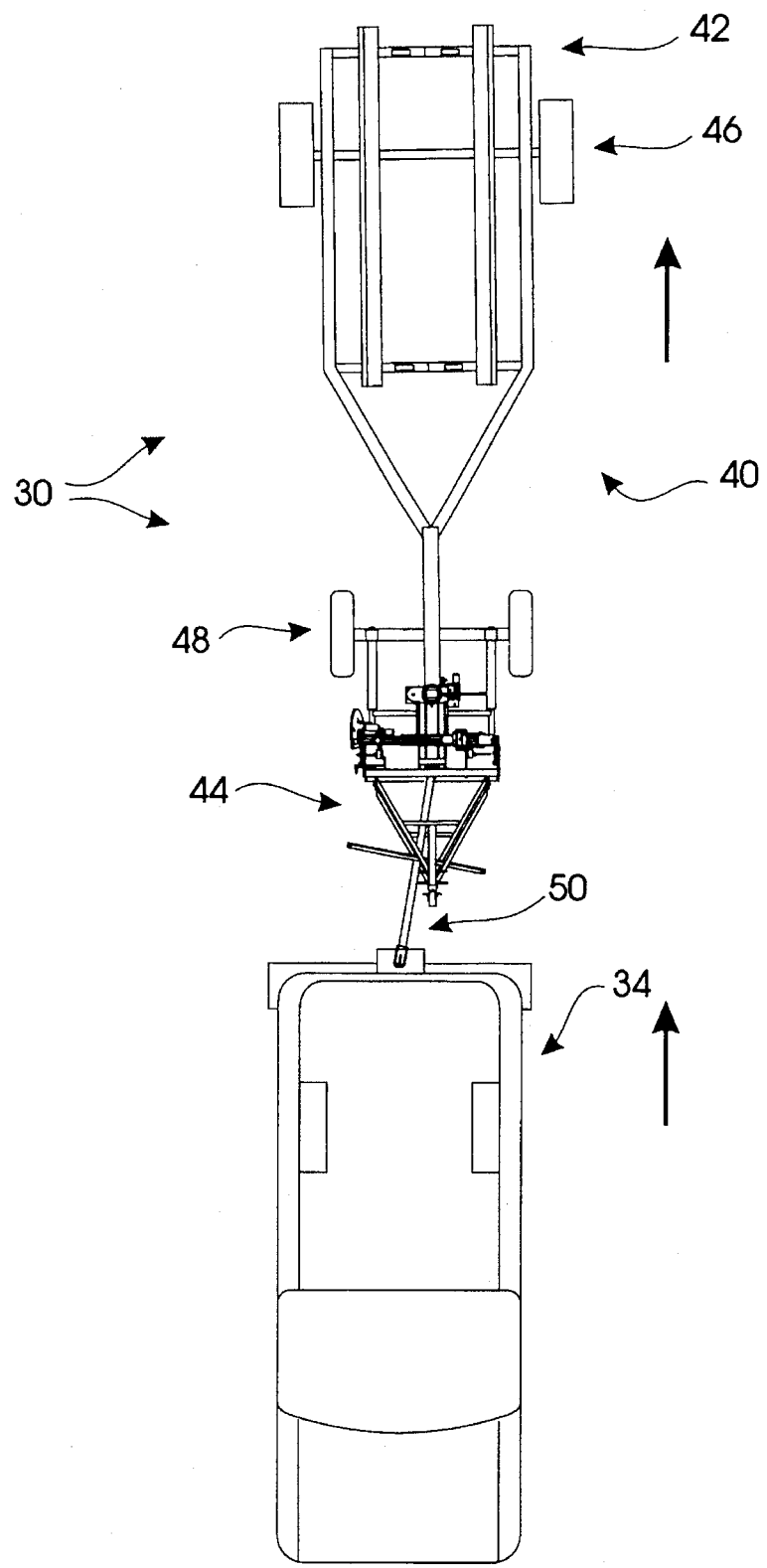
FIG. 11 is an environmental view similar to FIG. 1, showing the trailer backing up.
Figure 12:
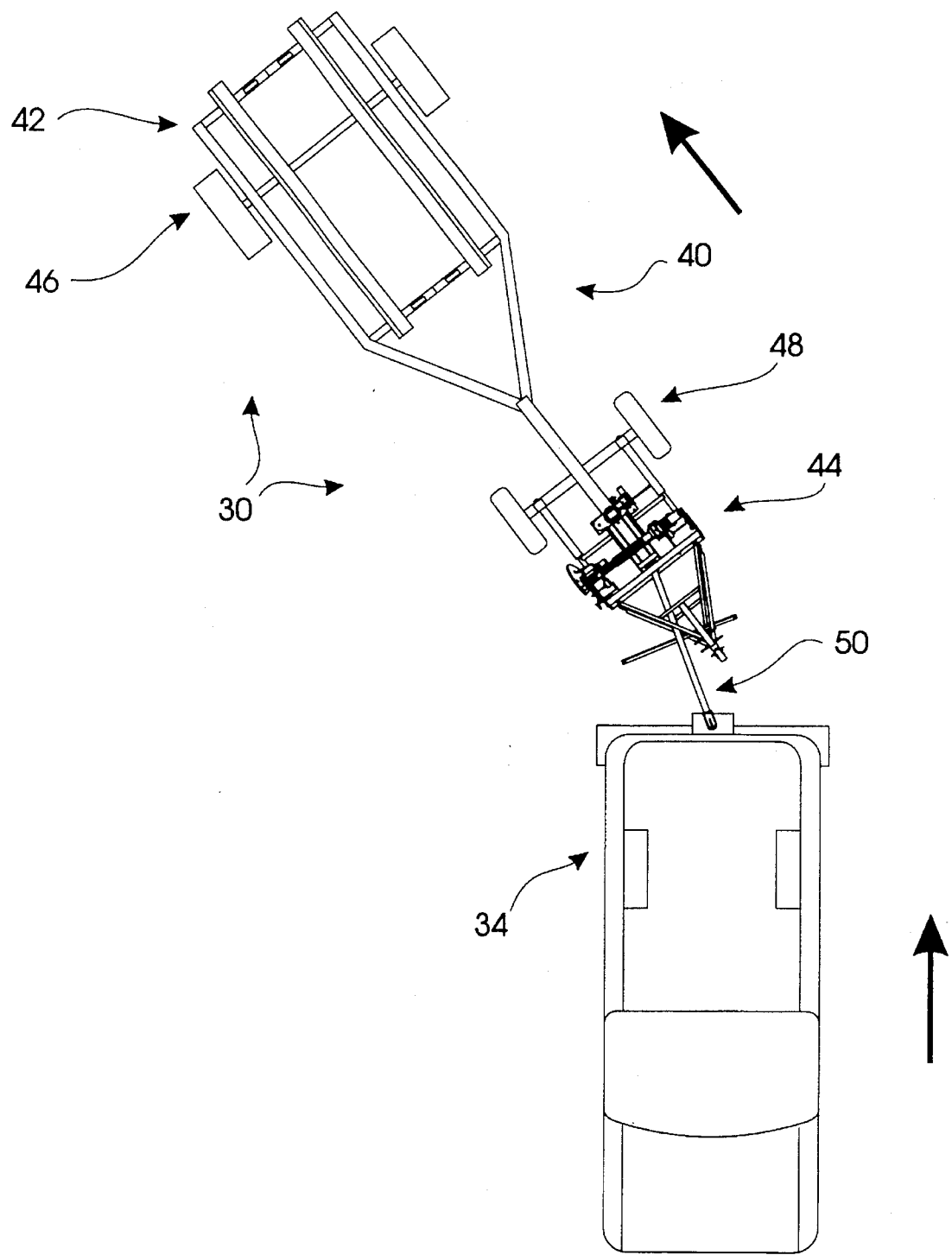
FIG. 12 is an environmental view similar to FIG. 11, showing the trailer backing up.
Figure 13:
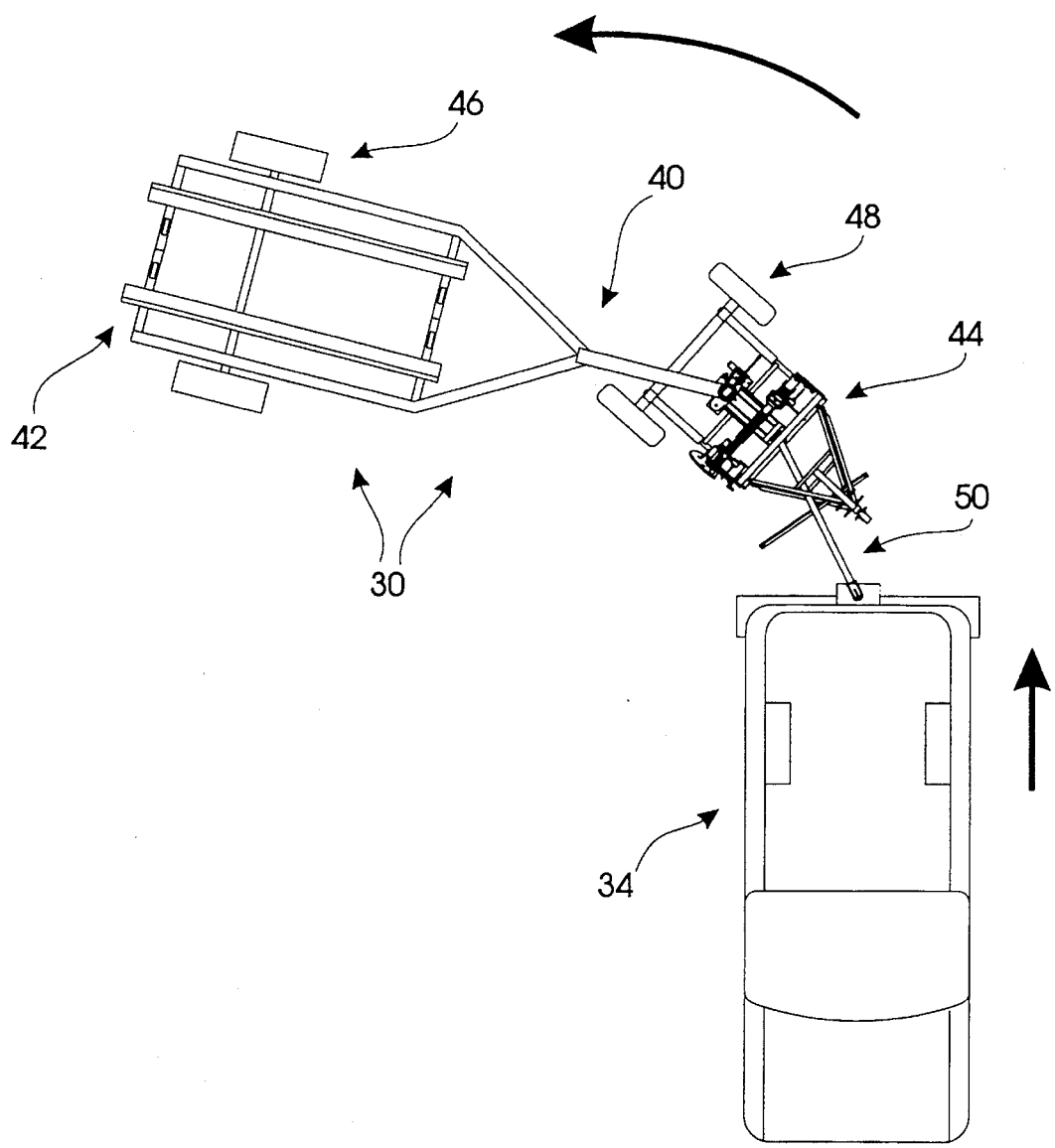
FIG. 13 is an environmental view similar to FIG. 12, showing the trailer backing up.

Backing operation of my trailer is best seen in FIGS. 11–13. The operator may selectively engage locking system 170 or 180 to transfer selected directional vectors to the trailer. In other words, the front axle 48 is prevented from rotating. However, the draw bar may still pivot about shaft 99. Thus, as the draft vehicle 34 moves rearwardly, the trailer 30 moves in a straight or preselected direction.

A contemplated embodiment could utilize a disc brake type mechanism to be interlocked for panic stop to actuate against the thrust plates 65, 82 to help prevent a jackknife on icy road braking.

An additional contemplated embodiment could utilize directionally ratcheted brakes on trailer and rear wheels to prevent a heavily loaded trailer from trying to roll forward when maneuvering to back up a hill.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An articulated trailer for transporting loads, said trailer adapted to be pulled behind a draft vehicle, said trailer comprising:

an elongated carriage adapted to be selectively coupled to the vehicle by a rigid elongated draw bar, said carriage comprising a fixed, wheeled rear axle and a separate, spaced-apart, pivoting front axle assembly, said front axle assembly comprising:
a wheeled front axle;
a frame supported above said axle; and,
control means for controlling the transfer of angular movement from said draw bar to said frame, said control means comprising a remotely actuated electric motor system.

2. The trailer as defined in claim 1 wherein said control means further comprises:

means for selectively, temporarily locking the pivotal movement of said draw bar relative to said frame;

means for limiting the pivotal movement of said draw bar relative to said frame; and, means for selecting and limiting the degree of radial movement of said front axle about said frame.

3. The trailer as defined in claim 2 wherein said means for selectively, temporarily locking the pivotal movement of said draw bar relative to said frame comprises an upper tongue attached to an intermediate section.

4. The trailer as defined in claim 2 wherein said means for limiting the pivotal movement of said draw bar relative to said frame comprises a pair of spaced-apart arms defining a closed channel for the movement of said draw bar.

5. The trailer as defined in claim 1 wherein said electric motor system further comprises:

an electric motor;

a rotatable plate coupled to said motor, said rotatable plate having a rectangular outline and adapted to be selectively rotated by said motor;

an arcuate plate spaced-apart from said rotatable plate and attached thereto by an elongated shaft, said elongated shaft facilitating the cooperative movement of said plates; and, tie rod means for pivotally connecting each of said plates to said draw bar.

6. The trailer as defined in claim 2 wherein said means for selecting and limiting the degree of radial movement of said front axle about said frame comprises a plurality of limit switches selectively mounted upon said intermediate section in the arcuate path of each of said plates.

7. The trailer as defined in claim 1 wherein said frame further comprises a rear shaft, said rear shaft comprising:

an upper plate penetrated by a plurality of regularly, arcuately spaced-apart orifices; and, a locking rod adapted to be temporarily disposed within a selected orifice in said plate to prevent the pivotal movement of said rear axle about said shaft.

8. An articulated trailer adapted to be pulled behind a draft vehicle or another trailer, said trailer comprising:

an elongated carriage adapted to receive a load to be transported, said carriage comprising a wheeled rear axle and a spaced-apart wheeled front axle;

an intermediate section adapted to pivotally connect said rear axle to said front axle;

a frame supported by said front axle, said frame comprising a first vertical shaft extending upwardly from the front of said intermediate section and a second vertical shaft extending upwardly from the rear of said intermediate section, said second shaft permitting the radial movement of said front axle relative to said rear axle;

a rigid, elongated draw bar pivotally attached to said frame and connecting said trailer to the draft vehicle;

offset means for controlling the transfer of angular movement from said draw bar to said frame, said offset means comprising:

a remotely actuated electric motor;

a rotatable plate coupled to said motor, said rotatable plate having a rectangular outline and adapted to be selectively rotated by said motor;

an arcuate plate spaced-apart from said rotatable plate and attached thereto by an elongated shaft, said elongated shaft facilitating the cooperative movement of said plates; and, tie rod means for pivotally connecting each of said plates to said draw bar.

9. The trailer as defined in claim 8 further comprising:

means for selectively, temporarily locking the pivotal movement of said draw bar relative to said frame;

means for limiting the pivotal movement of said draw bar relative to said frame; and, means for selecting and limiting the degree of radial movement of said front axle.

10. The trailer as defined in claim 9 wherein said means for selectively, temporarily locking the pivotal movement of said draw bar relative to said frame comprises an upper tongue attached to said intermediate section.

11. The trailer as defined in claim 9 wherein said means for limiting the pivotal movement of said draw bar relative to said frame comprises a pair of spaced-apart arms defining a closed channel for the movement of said draw bar.

12. The trailer as defined in claim 9 wherein said means for selecting and limiting the degree of radial movement of said front axle comprises a plurality of limit switches selectively mounted upon said intermediate section in the arcuate path of each of said plates.

13. The trailer as defined in claim 12 wherein said second shaft further comprises:

an upper plate penetrated by a plurality of regularly, arcuately spaced-apart orifices; and, a locking rod adapted to be temporarily disposed within a selected orifice in said plate to prevent the pivotal movement of said rear axle about said shaft.

14. An articulated trailer adapted to be pulled behind a draft vehicle, said trailer adapted to be remotely controlled to independently articulate and offset said trailer as desired, said trailer comprising:

an elongated carriage adapted to receive a load to be transported, said carriage comprising a fixed, wheeled rear axle and a separate, spaced-apart, pivoting front axle assembly, said front axle assembly comprising:

a wheeled front axle;

a frame supported by said front axle, said frame comprising a first vertical shaft extending upwardly from the front of said frame and a second vertical shaft extending upwardly from the rear of said frame for joining said rear axle to said assembly while permitting the pivotal movement of said front axle relative to said rear axle;

a rigid, elongated draw bar pivotally attached to said first shaft and connecting said trailer to the draft vehicle;

offset means for controlling the transfer of angular movement from said draw bar to said frame, said offset means comprising:

a remotely actuated electric motor;

a rotatable plate linked to said motor, said rotatable plate having a rectangular outline and adapted to be selectively rotated by said motor;

an arcuate plate spaced-apart from said rotatable plate and coupled thereto by an elongated shaft, said elongated shaft facilitating the cooperative movement of said plates;

tie rod means for pivotally connecting each of said plates to said draw bar;

control means for controlling the transfer of angular movement from said first shaft to said second shaft, said control means comprising:

means for selectively, temporarily locking the pivotal movement of said draw bar relative to said first shaft;

means for limiting the pivotal movement of said draw bar relative to said first shaft; and, means for selecting and limiting the degree of radial movement of said front axle.

15. The trailer as defined in claim 14 wherein said means for selectively, temporarily locking the pivotal movement of said draw bar relative to said frame comprises an upper tongue and lower tongue attached to said intermediate section.

16. The trailer as defined in claim 14 wherein said means for limiting the pivotal movement of said draw bar relative to said frame comprises a pair of spaced-apart arms defining a closed channel for the movement of said draw bar.

17. The trailer as defined in claim 14 wherein said means for selecting and limiting the degree of radial movement of said front axle comprises a plurality of limit switches selectively mounted upon said intermediate section in the arcuate path of each of said plates.

18. The trailer as defined in claim 14 wherein said second shaft further comprises locking means for preventing axle movement about said shaft during backup operations.

19. The trailer as defined in claim 18 wherein said locking means further comprises a first locking means for backup operations in a straight line and a second locking means for other than straight backup operations.

20. The trailer as defined in claim 18 wherein said locking means further comprises:

an upper plate penetrated by a plurality of regularly, arcuately spaced-apart orifices; and, a locking rod adapted to be temporarily disposed within a selected orifice in said plate to prevent the pivotal movement of said rear axle about said shaft.

21. The trailer as defined in claim 18 further comprising suspension means extending between the wheels of said front axle whereby said means permits elongation of said axle.

* * * * *